United States Patent

Negro

[15] 3,667,606
[45] June 6, 1972

[54] CONSTRUCTION OF FILTERS

[72] Inventor: Carmen Muela Negro, O'Donnell 13, Madrid, Spain

[22] Filed: Dec. 17, 1970

[21] Appl. No.: 99,041

[30] Foreign Application Priority Data

Dec. 30, 1969 Spain ..................................... 375038

[52] U.S. Cl. .............................. 210/193, 210/450, 210/453, 210/493
[51] Int. Cl. ........................................................ B01d 27/04
[58] Field of Search ........................... 210/75, 193, 450, 453

[56] References Cited

UNITED STATES PATENTS

| | | | |
|---|---|---|---|
| 2,851,164 | 9/1958 | Morino | 210/453 X |
| 2,937,752 | 5/1960 | Deschere | 210/193 X |
| 2,000,137 | 5/1935 | Kelley | 210/193 X |
| 3,056,503 | 10/1962 | Roosa | 210/453 X |
| 806,920 | 12/1905 | Rossi | 210/453 |
| 3,165,472 | 1/1965 | Briggs | 210/193 X |
| 3,296,781 | 1/1967 | Schumann | 210/453 X |

*Primary Examiner*—Samih N. Zaharna
*Attorney*—Howson and Howson

[57] ABSTRACT

A filtering canister which contains a filtering medium of diatomaceous earth which is retained within the canister by a foraminous support consisting of a series of concentric truncated cones of foraminous sheet material and a fabric disposed between the filtering medium and the sheet material. The innermost cone is secured at its inner edge around a central vertical pipe extending through the cover which permits the recharging of the filtering medium. Hoops are provided to loosely retain the fabric in place in the vertices of the cones when flow is arrested.

7 Claims, 1 Drawing Figure

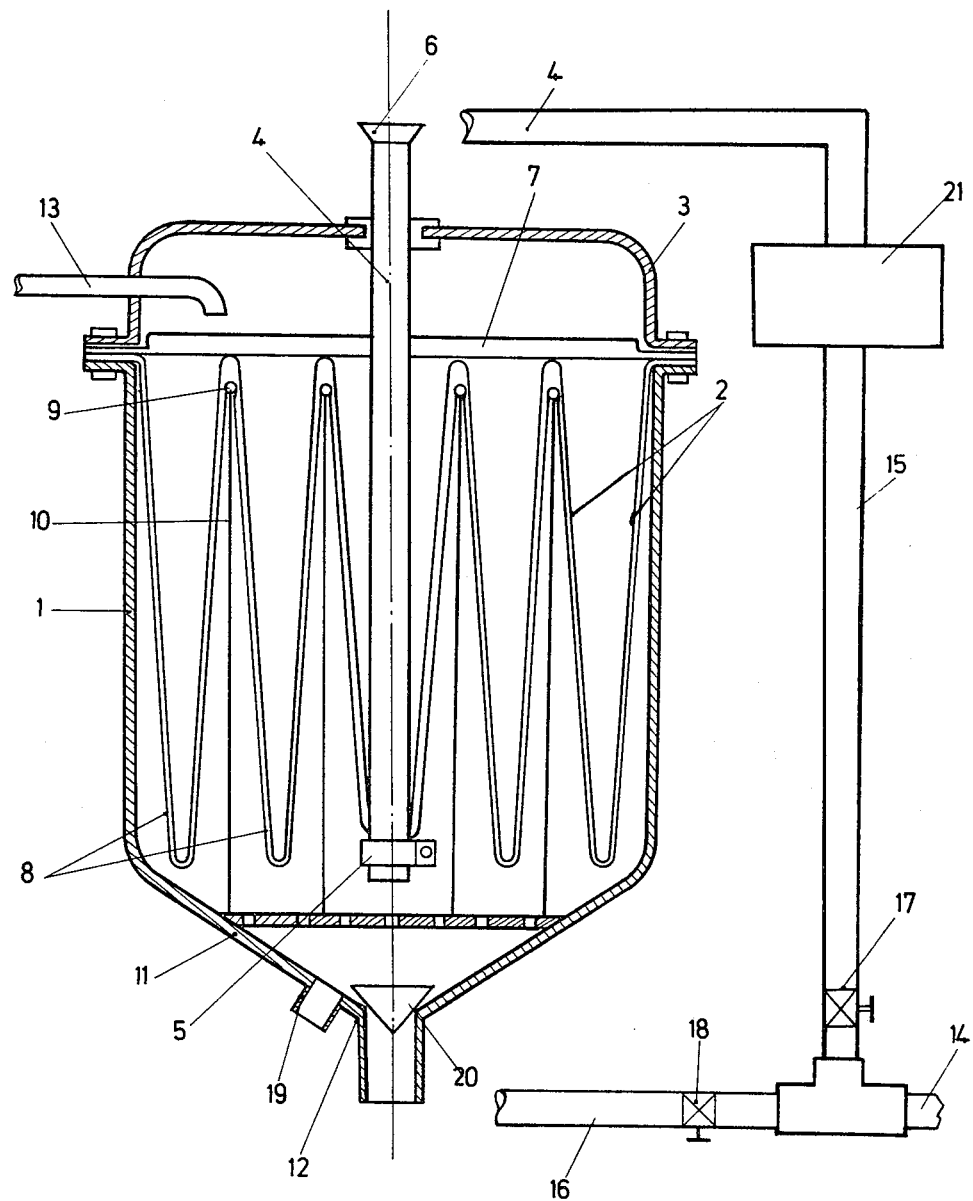

CONSTRUCTION OF FILTERS

The present invention relates to improvements in the construction of filters, of the type that uses a filtering medium generally diatomaceous earth, against an adequate support, such as a plastic fabric, fixed in a canister provided with an inlet and an outlet for the liquid to be filtered.

In accordance with the invention, on the inside of the canister a series of concentric truncated cones are disposed, alternately inverted with respect to one another, provided with a plurality of passage openings and arranged so as to constitute a continuous surface which defines the effective filtering surface, against the lower surface of which is located the fabric that will serve as the support for the filtering medium. The outermost truncated cone presents, on its upper margin, a flange which is supported and joined to the edge of the fabric, between the edge of the tank and its cover, with the appropriate sealed joint, whereas the lower margin of the innermost cone is seated upon a vertical central pipe which passes through the cover and discharges interiorly from beneath the said cones.

Between the flange of the outermost truncated cone and the central pipe, a plurality of radial arms are laid out to support the intermediate truncated cones. The truncated cones can be united with each other along their adjacent upper and lower margins, either by soldering or by welding the one with the other.

In the upper angle formed by each pair of truncated cones, a hoop or ring is disposed interiorly, near the vertex, against which the filtering fabric is held by the pressure of the liquid to be filtered.

With this arrangement the filtering surface of the fabric is used completely because there are no unused or doubled spaces. Another advantage of the filter according to the invention is the smaller size of the whole unit, which makes better use of the canister volume in producing a large filtering surface.

When the liquid to be filtered begins to pass through, the filtering cloth, because of the pressure, rises up a little, nevertheless remaining supported against the surface of the cones; but when the water stops flowing through the filtering cloth, owing to the weight and the return flow of the water, it tends to fall down. Its support on the upper hoops prevents this, but nevertheless these do not prevent the fabric from vibrating, and resulting in a loosening of the filtering earth compressed on the fabric because of the pressure of the water during filtration.

The central vertical pipe serves as a means of introducing new filtering earth without having to disassemble the filter, nor does the earth have to pass through the pump.

In the lower part of the canister, between the truncated cones mentioned and the entrance passage, a plate containing passage holes is presented, from which a series of vertical rods extend to support the hoops used for supporting the fabric.

The central vertical pipe which passes through the cover can lead out, according to one variant exteriorly into a receptacle that contains filtering earth for subsequent additions to the filter. A branch of the principal inlet pipe for the liquid to be filtered also comes to this receptacle, and the pipe carries the filtering earth toward the inside of the filter, assuming that the pipe and the branch are provided with valves to permit passage in the desired direction.

Using the filter according to the invention, it is thus easy to achieve the loosening of the filtering product during the pauses, owing to the fall of the fabric, and furthermore it is always possible to introduce as desired a new quantity of the filtering medium which adds to that already used in the previous run.

Also, the filter of the invention allows a semi-automatic or automatic functioning, due to the fact that the cessation of water passing through is able to produce an increase in pressure on the inside of the canister when the superficial filtering medium has become clogged because of dirtiness, to such an extent that the inside pressure passes certain limits.

The design, characteristics and advantages of the filter of the invention are made clearer in the following description, staged with reference to the attached drawing, which shows diagrammatically a diametric section of the unit.

In the sketch, 1 indicates the canister in whose interior is laid out a series of truncated cones 2, concentric and inverted alternately so that a continuous surface is obtained. These truncated cones can be joined together or coupled by their adjacent borders.

For the fastening of the cones to the tank, the outermost cone has along its edge a flange that is held suspended between the canister 1 and its cover 3. On its lower side, the innermost cone is fastened to a central axis pipe 4 by means of a collar 5 through which pipe the filtering product is introduced.

The above-mentioned central pipe 4 passes through the cover 3 of the canister and discharges to the outside, closed by means of a stopper 6.

Between the central pipe 4 and the flange of the outermost cone are placed some radial arms 7 to which are attached the ends of the intermediate cones.

The cones 2 equipped over the entire surface with a series of passage apertures or orifices support on the lower surface the filtering fabric 8, preferably plastic, which constitutes the auxiliary filter device. In those internal upper vertices formed between each successive pair of cones are found a plurality of rings or hoops 9 that are held up by the vertical rods 10 which project from the lower plate 11 which is located between the mentioned cones and the inlet of the tank 12, the inlet being equipped with an inlet valve 20 which impedes the exit of the filtering earth when it falls to the bottom when the flow stops. As has already been said, the liquid to be filtered is introduced via the inlet 12 alone, or according to a variant, an auxiliary system is added to the filter for the automatic replacement of the filtering product, as will be disclosed later.

Finally, the outlet pipe 13 leaves the cover 3 on top of the radial arms 7 and goes to the outside.

Under these conditions, when the flow of water to be filtered is begun, its pressure makes the filtering fabric rise a little although supported on the truncated cones 2. When the water stops flowing, the material 8, because of its weight and the return flow of the water tends to descend; but its retention on the upper hoops 9 impede it. Nevertheless, these do not stop the fabric from vibrating, thus causing the fall of the filtering earth over the bottom of the canister. When the water stops flowing the valve 20 at the inlet 12 closes, making it impossible for the auxiliary filtering medium to leave the canister 1. If it is desired to put in a new supply of auxiliary filtering medium, this is put in through the duct 4 as has been said, and it also falls to the bottom of the canister, being carried along with the product already used, onto the filtering fabric when the water flows again.

In a different embodiment, the introduction of the filtering medium can be done automatically. For this purpose, an entrance pipe 14 is provided for the water to be filtered, that branches into two conduits 15 and 16 from which the first is led to a receptacle 21 in which the auxiliary filtering material for successive additions to the canister 1 is stored. To this receptacle 21 comes the central axial pipe 4, which in this case is not provided with the stopper 6. The other branch 16 connects to the inlet 12 of the tank 1, the branches 15 and 16 being provided with the appropriate passage valves 17 and 18. To add a new charge of the filtering medium, the passage valve 18 is closed and valve 17 is opened so that the water that comes to the receptacle 21 removes the filtering medium, carrying it along the conduit 4 to the lower part of the canister 1. When the quantity of the auxiliary medium introduced is considered sufficient, the passage valve 17 closes and valve 18 opens, and thereupon the normal filtering operation commences. Under these circumstances it is necessary to arrange a passage valve in the collar 5 at the lower extreme of the duct 4 that closes when the water flow for the filtering begins.

The valves 17 and 18, can obviously be replaced by only one two-way valve, which allows the water to flow toward the conveyance 15 or 16 as well as closing completely behind the two branches.

In the water inlet to the canister 1 it is possible to place a manometer (not shown), in such a manner that upon attaining a predetermined pressure, it actuates a timing relay that stops the pump or closes the intake valve for a predetermined time, sufficient for the loosening and the resetting of the diatomaceous earth or other filtering medium above the bottom and the valve. At the same time it is possible to actuate valve 17 in the direction which will permit passage through the conduit 15 of the liquid that will pass into the receptacle 21, carrying along a new amount of filtering earth to the inside of the canister 1.

The filter of the invention permits the placing of a large filtering surface in a reduced volume, owing to the truncated cones that form the support for the filtering fabric.

The canister 1 contains, at the bottom, an opening or passage 19 for extracting the used filtering medium as desired, without needing to dismantle the whole unit.

When it is desired to examine the inside of the filter, it is sufficient to remove the screws that hold the cover 3 in order to remove the cones and the filtering fabric together, making it possible, by taking off the plate 11, to clean the bottom of the canister thoroughly. It is also very easy to locate and dismantle the fabric support, for which it is sufficient to take off the collar 5 to loosen it.

It should be well understood that the invention is not limited to the embodiments described, but that it is capable of various changes and modifications without departing from its intent and its spirit.

What is claimed is:

1. Improvements in the construction of filters of the type employing an auxiliary filtering medium, comprising a canister equipped with a lower inlet and an upper outlet through which the liquid filters, a foraminous support in said canister, and a central pipe for said auxiliary medium extending vertically through the support and discharging into said canister below said support, characterized in that the support comprises a series of concentric truncated cones inverted alternately with respect to each other disposed inside the canister, each one supplied with a multiplicity of openings and arranged so that they constitute a continuous surface that defines an effective filtering surface, a fabric on the under side of said surface to confine the filtering medium therebelow, said support being mounted by the outermost truncated cone around the edge of the canister with a sealed joint, and by the innermost truncated cone to the central vertical pipe, said fabric conforming substantially to said under surface, and means mounting said fabric adjacent said undersurface with limited freedom for movement toward and away from said surface upon commencement and interruption of liquid flow through said canister.

2. Improvements according to the claim 1, characterized in that the outermost truncated cone has a flange for mounting said support around the canister edge, and between said flange and the central vertical pipe, plural radial arms are provided, to which the intermediate truncated cones are fastened.

3. Improvements according to claim 1, characterized in that the truncated cones of said support are joined to each other along their adjacent edges.

4. Improvements according to claim 1, wherein said mounting means comprises a hoop disposed in each of the upper angles formed between adjacent pairs of truncated cones, internally around the vertex to retain the filtering fabric in place when the flow of the liquid stops.

5. Improvements according to claim 4, characterized in that a perforated plate is disposed in the lower part of the canister between the truncated cones and the inlet; and a series of vertical rods supported by said plate and which in turn support the hoops for retaining the fabric in place.

6. Improvements according to claim 1, characterized by a receptacle containing the auxiliary filtering medium connected to said central pipe, a branch off of the inlet for the liquid to be filtered connected to said receptacle, and both in said inlet and in said branch a passage valve.

7. Improvements according to claim 1 wherein said concentric truncated cones all have the same cone angle and are connected so that a continuous surface is obtained, said fabric having a similar cone angle.

* * * * *